Dec. 13, 1949  R. SHEPHARD  2,491,062
MOTORCYCLE CARRIER ATTACHMENT
Filed Dec. 30, 1946  2 Sheets-Sheet 1

INVENTOR.
RAYMOND SHEPHARD
BY
ATTORNEY.

Dec. 13, 1949 R. SHEPHARD 2,491,062
MOTORCYCLE CARRIER ATTACHMENT
Filed Dec. 30, 1946 2 Sheets-Sheet 2

INVENTOR.
RAYMOND SHEPHARD
BY
ATTORNEY.

Patented Dec. 13, 1949

2,491,062

UNITED STATES PATENT OFFICE 2,491,062

MOTORCYCLE CARRIER ATTACHMENT

Raymond Shephard, Denver, Colo.

Application December 30, 1946, Serial No. 719,308

10 Claims. (Cl. 280—202)

This invention relates to compartmented housings adapted to function in removable and replaceable association with motorcycles, bicycles, and the like, as carriers for the readily-accessible accommodation of packages, parcels, gear, tools, accessories, supplies, and analogous material desired to be transported, and has as an object to provide a novel construction and arrangement of elements constituting an improved such carrier.

A further object of the invention is to provide an improved compartmented housing adapted for convenient attachment to a tandem-wheeled vehicle as a carrier without impairment of the balance and functional characteristics of the vehicle.

A further object of the invention is to provide an improved compartmented housing conveniently adjustable in attached relation with a tandem-wheeled vehicle to permit of ready access to the adjacent vehicle wheel and wheel mounting.

A further object of the invention is to provide an improved housing attachment for tandem-wheeled vehicles characterized by large carrying capacity in proportion to its weight and operation-hampering projection beyond an associated vehicle.

A further object of the invention is to provide an improved housing attachment for tandem-wheeled vehicles susceptible of mounting on and as a carrier for an associated vehicle with a minimum of vehicle alteration and modification.

A further object of the invention is to provide an improved tandem-wheeled vehicle carrier attachment arranged to fully enclose, safe-guard, and protect material transported therein.

A further object of the invention is to provide an improved tandem-wheeled vehicle carrier attachment that is simple and inexpensive of manufacture from commonly-available materials, susceptible of practical embodiment in a wide variety of particular sizes and specific designs adapted for association with various makes and constructions of vehicles, efficient, durable, and convenient in use, and effective to enlarge the utility of a vehicle wherewith associated.

Figure 1:
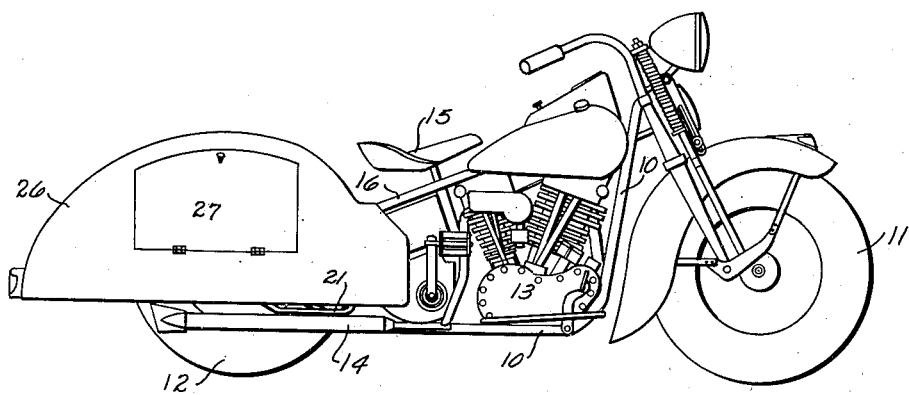
Figure 3:
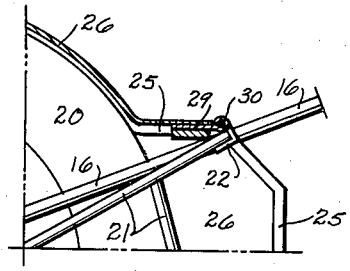
Figure 2:
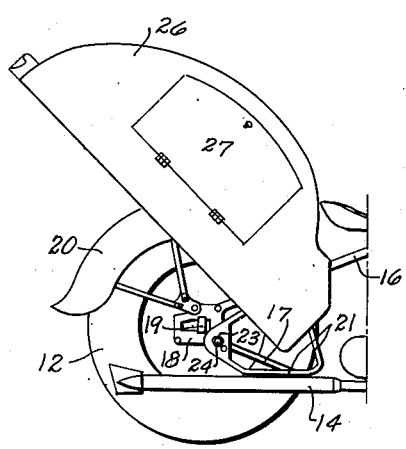
Figure 4:
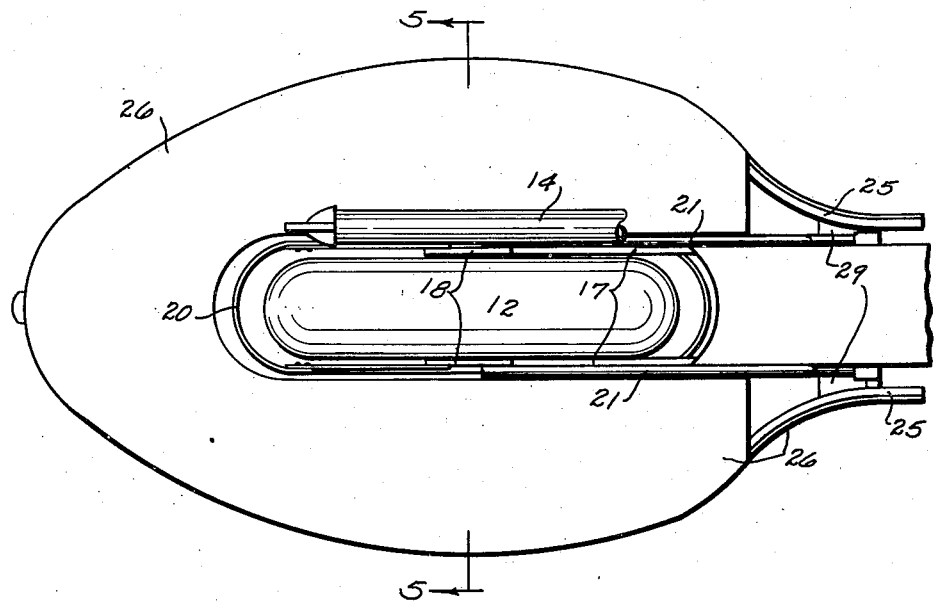
Figure 5:
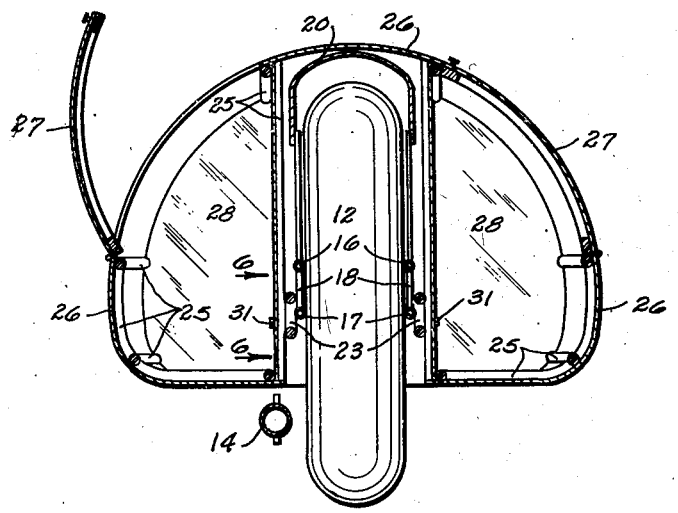
Figure 6:
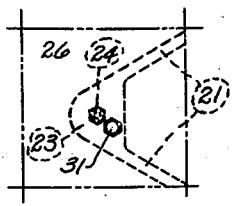

With the foregoing and other objects in view, my invention consists in the construction, arrangement, and combination of elements hereinafter set forth, pointed out in my claims, and illustrated by the accompanying drawings, in which:

Figure 1 is a side elevation of a conventional motorcycle equipped with a preferred embodiment of the invention in position thereon ready for practical use. Figure 2 is an elevation of the rear portion of the assembly according to Figure 1 with the carrier unit of the invention at an alternative limit of its range of adjustment. Figure 3 is a fragmentary, detail section, on an enlarged scale, through the hinge and related elements employed to connect the carrier unit forward end with the motorcycle frame. Figure 4 is a rear portion bottom plan view, on an enlarged scale, of the assembly according to Figure 1. Figure 5 is a cross section taken substantially on the indicated line 5—5 of Figure 4. Figure 6 is a fragmentary, detail elevation, on a further enlarged scale, of the area indicated generally as embraced between the arrows 6—6 of Figure 5, otherwise concealed elements pertinent to the showing being indicated by broken lines.

The well-known utility and advantages of tandem-wheeled vehicles, such as bicycles and motorcycles, may be extended and enhanced through the association therewith of carriers for the reception and transportation of materials, parcels, and the like, not otherwise adapted for attachment to such vehicles, and the instant invention is directed to the provision of an improved carrier of substantial capacity readily attachable to a tandem-wheeled vehicle with operative security in such manner as to minimize impairment of the normal vehicle operations and functions and to interfere but little with the occasionally necessary vehicle maintenance and repair work.

In the construction of the improvement as shown, a conventional tandem-wheeled vehicle of motorcycle type is represented as including the usual frame 10, front wheel 11, rear wheel 12, engine 13, engine exhaust line 14, and saddle 15, in a customary operative association. Conforming with standard practice, rearwardly-extending members of the frame 10 are formed as upper and lower forks, 16 and 17, respectively, disposed to embrace the forward portion of the wheel 12 and to converge into rigid engagement of their ends on each side of said wheel with and for the support of a bracket yoke 18 wherein the corresponding end of the wheel axle 19 is adjustably engaged, and a fender 20 protectively houses upper and forward portions of the wheel 12 within the spread of the fork 16 and in rigidly-supported relation with said fork and the bracket 18.

Giving effect to the concept of the invention and to provide means for mounting the improved carrier on and in the desired association with vehicles of the illustrated type, a rigid supplemental frame is formed as a pair of identical loop panels 21 having corresponding ends of their outwardly-extending upper members secured to and fixedly interconnected by a strut 22 in such manner as to dispose the loop frames 21 in spaced, parallel registration and the strut 22 perpendicular to the planes of said frames and bridging therebetween. Each frame 21 terminates rearwardly in a generally-triangular, integral web 23 adapted to overlie and be secured, as by means of a bolt 24, to a forward lower corner of the bracket 18 on its side of the wheel 12 when the strut 22 is engaged against and to laterally traverse the fork 16 forwardly of the wheel 12 and its fender 20 and beneath the rearward overhang of the saddle 15, the length of the strut 22 being such as to space the frames 21 apart a distance suitable for the frame disposition shown and described without alteration of the vehicle main frame and associated vehicle components. Where the strut 22 traverses the fork 16, it is fixedly secured to the fork members in any desired effective manner, as by means of clamps, bolts, cap screws, or the like, thus completing secure attachment of the supplemental frame to the rigid, rearwardly-extending portion of the vehicle frame 10.

The carrier body of the invention is a unitary housing defining and enclosing compartments disposable on each side and to the rear of the vehicle wheel 12, said body comprising a skeleton frame fabricated from rigidly-interconnected structural members 25 and frame-covering walls 26 of sheet material. The frame-forming members 25 may be of any selected shape, size, strength, number, and specific arrangement consistent with the contemplated mounting and use of the attachment, and said members are assembled, preferably by interwelding, to define and outline an upwardly and outwardly arched, braced unit of modified streamline or "tear-drop" form characterized by a flat bottom and a downwardly and forwardly opening well sized to telescopically receive and accommodate the rear wheel 12 and associated elements of the vehicle whereto it is to be attached. The unit outlined by the members 25 is of a length considerably exceeding the diameter of the vehicle wheel 12, has a maximum transverse dimension at about the midpoint of its length, converges forwardly to merge into and shape the forwardly-opening mouth of its well, and smoothly converges rearwardly to a closed end spaced outwardly away from the rearward closed end of the unit well. Certain of the members 25 are arranged in spaced opposition interiorly and to traverse the full depth of the unit along planes constituting the sides of the unit well and another of the said members connects transversely of the unit between upper forward corners thereof in bridging relation across the upper end of the well forwardly-opening mouth in position to align with and closely overlie the strut 22 of the supplemental frame when the unit is operatively associated with the vehicle. After fabrication of the carrier body skeleton frame has been accomplished, the exterior, bottom, and well side and inner end surfaces thereof are smoothly covered with sheet material 26, such as light-weight sheet metal, to enclose said frame and complete a housing of the desired form and contour, the sheet material 26 extending across the upper arch or crown of the unit to bridge across and close over the upper end of the wheel-accommodating well, and access openings interrupting the extent of said sheet material between frame members 25 being fitted with hinged, latchable doors 27 sized and positioned for convenient admission to the housing compartments. Fabricated as shown and described, the carrier body unit has a continuous hollow interior or compartment U-shaped in plan resulting from intercommunication of the enclosure side and rear end sections and adapted for the reception of material to be transported introducible thereinto through the doors 27, which interior, if desired, may be subdivided by means of bulkheads or partitions 28 into lesser, separate compartments of selected number, location, and capacities.

The carrier body, as a unit assembly, is adapted to fit over, embrace, and substantially house the rear wheel 12 and fender 20 of a vehicle equipped with the supplemental frame comprised from the elements 21, 22 and 23, said wheel and fender being received within the body well with the body crown closing closely adjacent the fender, and to be secured in such mounted relation for convenient hinged altitudinal adjustment and for ready detachment. As operatively related with its associated vehicle, the unit transverse frame member 25 at the upper margin of the well forward opening parallels and closely overlies the strut 22 of the supplemental frame fixed to the vehicle, so that complementary hinge members 29 formed on or fixed to said frame member and strut may be cooperatively engaged by a pintle 30 to complete a hinge connection between the vehicle frame and the forward end of the carrier unit about which the said unit may be swung through a limited vertical arc, thereby engaging the carrier unit with and for transport by the vehicle while providing for elevation of said unit out of covering relation with the wheel axle 19 and related vehicle elements. When hingedly engaged with the strut 22 and in its lowered position of practical utility, the carrier unit is disposed with a frame member 25 of each of its well side walls exteriorly overlying and closely adjacent the web 23 of the associated loop frame 21, so that bolts, cap screws, or like fastening elements 31 secured in engaging relation through registering holes formed in each said web 23 and the adjacent frame member 25 function to lock and hold the unit well side walls to rigid elements of the supplemental frame and thereby immobilize the carrier unit on and in operative, transportable relation with the vehicle. The fastening elements 31 being readily accessible through the compartment doors 27 of the unit, disengagement of said elements is a simple operation effective to permit angular elevation of the unit to the position of Figure 2, and subsequent disengagement of the hinge pintle 30 fully frees the unit for removal from the vehicle.

Since many changes, variations, and modifications in the specific form, construction, and arrangement of the elements shown and described may be had without departing from the spirit of my invention, I wish to be understood as being limited solely by the scope of the appended claims, rather than by any details of the illustrative showing and foregoing description.

I claim as my invention:

1. The combination with a tandem-wheeled vehicle of a rigid, compartmented carrier unit telescopically and embracingly arranged about the vehicle rear wheel upper portion in normal covering relation with the wheel mounting, and optionally-manipulatable means removably and replaceably securing said unit to the vehicle for limited angular adjustment through a vertical arc relative thereto and into uncovering relation with the said wheel mounting.

2. The combination with a tandem-wheeled vehicle of a rigid, supplemental frame secured to the vehicle frame rear portion, a rigid, compartmented, carrier unit telescopically and embracingly arranged about the vehicle rear wheel upper portion and said supplemental frame in normal covering relation with the wheel mounting, and optionally-manipulatable means removably and replaceably securing said unit to said supplemental frame for limited angular adjustment through a vertical arc relative to the vehicle and into uncovering relation with the said wheel mounting.

3. The combination with a tandem-wheeled vehicle of a rigid, compartmented, carrier unit telescopically and embracingly arranged about the vehicle rear wheel upper portion in normal covering relation with the wheel mounting, a hinge connecting between the unit upper forward margin and adjacent vehicle frame elements to mount said unit on and for limited angular adjustment through a vertical arc relative to the vehicle and into uncovering relation with the said wheel mounting, and optionally-manipulatable means for securing intermediate points of said unit to fixed elements of the vehicle rearwardly of said hinge.

4. The combination with a tandem-wheeled vehicle of a rigid, supplemental frame secured to the vehicle frame rear portion, a rigid, compartmented, carrier unit telescopically and embracingly arranged about the vehicle rear wheel upper portion and said supplemental frame in normal covering relation with the wheel mounting, a hinge connecting between the unit upper forward margin and an adjacent supplemental frame element to mount said unit on and for limited angular adjustment through a vertical arc relative to the vehicle and into uncovering relation with the said wheel mounting, and optionally-manipulatable means for securing intermediate points of said unit to elements of said supplemental frame rearwardly of said hinge.

5. A carrier attachment for tandem-wheeled vehicles, comprising a rigid closed housing equipped with access doors, a forwardly and downwardly opening well longitudinally intersecting said housing for the accommodation of an associated vehicle rear wheel upper portion, and optionally-manipulatable means for removably and replaceably securing said housing to the vehicle in telescopically embracing relation with the rear wheel thereof to normally cover the wheel mounting and for limited angular adjustment through a vertical arc relative thereto into uncovering relation with the said wheel mounting.

6. A carrier attachment for tandem-wheeled vehicles, comprising a rigid, supplemental frame securable to and in yoking relation with a vehicle frame rear portion, a rigid closed housing equipped with access doors, a forwardly and downwardly opening well longitudinally intersection said housing for the accommodation of said supplemental frame and an associated vehicle rear wheel upper portion, and optionally-manipulatable means for removably and replaceably securing said housing to said supplemental frame in telescopically embracing relation with the associated vehicle rear wheel to normally cover the wheel mounting and for limited angular adjustment through a vertical arc relative thereto into uncovering relation with the said wheel mounting.

7. A carrier attachment for tandem-wheeled vehicles, comprising a rigid closed housing equipped with access doors, a forwardly and downwardly opening well longitudinally intersecting said housing for the accommodation of an associated vehicle rear wheel upper portion, a hinge member on the upper limiting margin of the forwardly-opening housing well mouth connectible with vehicle frame elements to mount the housing in telescopically embracing relation with the associated vehicle rear wheel in normal covering relation with the wheel mounting and for limited angular adjustment through a vertical arc relative thereto into uncovering relation with the said wheel mounting, and optionally-manipulatable means for securing intermediate points of said housing to fixed elements of the associated vehicle rearwardly of said hinge.

8. A carrier attachment for tandem-wheeled vehicles, comprising a rigid, supplemental frame securable to and in yoking relation with a vehicle frame rear portion, a rigid closed housing equipped with access doors, a forwardly and downwardly opening well longitudinally intersecting said housing for the accommodation of said supplemental frame and an associated vehicle rear wheel upper portion, hinge members on the upper limiting margin of the forwardly-opening housing well mouth and a supplemental frame transverse member interconnectible to mount the housing in telescopically embracing relation with the supplemental frame and associated vehicle rear wheel in normal covering relation with the wheel mounting and for limited angular adjustment through a vertical arc relative thereto into uncovering relation with the said wheel mounting, and optionally manipulatable means for securing intermediate points of said housing to elements of said supplemental frame rearwardly of said hinge.

9. In a carrier attachment for tandem-wheeled vehicles, a rigid, supplemental frame securable to and in yoking relation with a vehicle frame rear portion to dispose an intermediate element transversely of the vehicle frame and forwardly of the vehicle rear wheel, a rigid closed housing symmetrical with respect to its longitudinal median plane equipped with access doors and formed with a longitudinally-disposed, forwardly and downwardly opening well for the accommodation of said supplemental frame and an associated vehicle rear wheel upper portion in normal covering relation with the wheel mounting, means hingedly interconnecting a forward margin of said housing to said supplemental frame intermediate element for angular adjustment of said housing into uncovering relation with the said wheel mounting, and optionally-manipulatable means for securing intermediate points of the housing well side walls to rearward elements of said supplemental frame.

10. In a carrier attachment for tandem-wheeled vehicles, a rigid, supplemental frame securable to and in yoking relation with a vehicle frame rear portion to dispose an intermediate element transversely of the vehicle frame and forwardly of the vehicle rear wheel and rearward terminal elements adjacent said rear wheel axle ends, a rigid closed housing symmetrical with respect to its longitudinal median plane equipped with access doors and formed with a longitudinally-disposed, forwardly and downwardly opening well for the accommodation of said supplemental frame and an associated vehicle rear wheel upper portion in normal covering relation with the wheel mounting, complementary hinge members on said supplemental frame intermediate member and the upped limiting margin of the forwardly-opening housing well mouth interconnectible to mount the housing in telescopically embracing relation with the supplemental frame and associated vehicle rear wheel and for limited angular adjustment through a vertical arc relative thereto into uncovering relation with the said wheel mounting and optionally-manipulatable means engageable through the housing well side walls and with the rearward terminal elements of said supplemental frame to immobilize said housing relative to said supplemental frame.

RAYMOND SHEPHARD.

REFERENCES CITED

The following references are of record in the file of this patent:

FOREIGN PATENTS

| Number | Country | Date |
|--------|---------|------|
| 25,759 | Great Britain | Nov. 26, 1904 |
| 178,726 | Switzerland | Oct. 16, 1935 |
| 832,707 | France | July 4, 1938 |